United States Patent
Camalig et al.

(10) Patent No.: US 9,013,820 B1
(45) Date of Patent: Apr. 21, 2015

(54) METHOD OF REDUCING THERMAL STRESS WITHIN A MAGNETIC HEAD

(71) Applicant: Seagate Technology LLC, Cupertino, CA (US)

(72) Inventors: Clifford Jayson Bringas Camalig, Sinagpore (SG); Gan Swee Chuan, Singapore (SG); Kai K. Yang, Singapore (SG); Mui Chong Chai, Singapore (SG)

(73) Assignee: Seagate Technology LLC, Cupertino, CA (US)

( * ) Notice: Subject to any disclaimer, the term of this patent is extended or adjusted under 35 U.S.C. 154(b) by 0 days.

(21) Appl. No.: 14/259,598

(22) Filed: Apr. 23, 2014

(51) Int. Cl.
  *G11B 5/02* (2006.01)
  *G11B 20/10* (2006.01)
(52) U.S. Cl.
  CPC ................ *G11B 20/10009* (2013.01)
(58) Field of Classification Search
  None
  See application file for complete search history.

(56) References Cited

U.S. PATENT DOCUMENTS

| | | | |
|---|---|---|---|
| 6,008,640 A | 12/1999 | Tan | |
| 6,293,135 B1 | 9/2001 | Marchon | |
| 6,975,472 B2 | 12/2005 | Stover | |
| 7,190,543 B2 | 3/2007 | Suk | |
| 7,564,649 B2 | 7/2009 | Hanchi | |
| 8,553,350 B2 | 10/2013 | Zhou | |
| 8,755,136 B1 * | 6/2014 | Ng et al. | 360/31 |
| 2008/0019041 A1 | 1/2008 | Aoki | |
| 2012/0106006 A1 | 5/2012 | Araki | |
| 2012/0176873 A1 | 7/2012 | Brand | |

OTHER PUBLICATIONS

U.S. Appl. No. 14/062,549, filed Oct. 24, 2013, Camalig.
Tongsomporn et al., "An Experimental Study of Head Instabilities in TMR Sensors for Magnetic Recording Heads with Adaptive Flying Height," *IEICE Trans.*, vol. E91-C, No. 12, Dec. 2008, pp. 1958-1965.
Tongsomporn et al., "An Experimental Study of Head-Disk Clearance Sensitivity and Instabilities in Magnetic Recording Heads with Adaptive Flying Height," *Contributed Paper*,2 pages, Dec. 2008.

* cited by examiner

*Primary Examiner* — Muhammad N Edun
(74) *Attorney, Agent, or Firm* — Mueting, Raasch & Gebhardt

(57) ABSTRACT

Devices and methods for reducing thermal stress within a head of a storage device are disclosed. In one or more embodiments, a method includes writing a selected pattern to a storage medium of a storage device using a head of the storage device; reading the selected pattern from the storage medium using the head to provide a data signal; and calculating an instability value of the head based on the data signal. The method can further include reconfiguring the storage device if the instability value is greater than an instability threshold by performing at least one of: deactivating a heater if the head includes two or more heaters; and increasing a fly height between the head and the storage medium.

20 Claims, 7 Drawing Sheets

METHOD OF REDUCING THERMAL STRESS WITHIN A MAGNETIC HEAD

SUMMARY

In general, the present disclosure provides one or more embodiments of devices and methods for reducing thermal stress within a head of a storage device.

In one aspect, the present disclosure provides a method that includes writing a selected pattern to a storage medium of a storage device using a head of the storage device; reading the selected pattern from the storage medium using the head to provide a data signal; and calculating an instability value of the head based on the data signal. The method further includes reconfiguring the storage device if the instability value is greater than an instability threshold by performing at least one of: deactivating a heater if the head includes two or more heaters; and increasing a fly height between the head and the storage medium.

In another aspect, the present disclosure provides a method that includes writing a selected pattern to a storage medium of a storage device using a head of the storage device; reading the selected pattern from the storage medium using the head to provide a first data signal; calculating a first instability value of the head based on the first data signal; and annealing the head if the first instability value is greater than a first instability threshold. The method further includes reading the selected pattern from the storage medium using the head to provide a second data signal; calculating a second instability value of the head based on the second data signal; and reconfiguring the storage device if the second instability value is greater than a second instability threshold by performing at least one of: deactivating a heater if the head includes two or more heaters; and increasing a fly height between the head and the storage medium.

In another aspect, the present disclosure provides a system that includes a computing apparatus configured to be coupled to one or more storage devices, each storage device including a storage medium and a head configured to write and read data from the storage medium. The computing apparatus is configured to: write a selected pattern to the storage medium using the head of at least one storage device; read the selected pattern from the storage medium using the head to provide a data signal; and calculate an instability value of the head based on the data signal. The computing apparatus is also configured to reconfigure the storage device if the instability value is greater than an instability threshold by performing at least one of: deactivating a heater if the head includes two or more heaters; and increasing a fly height between the head and the storage medium.

In another aspect, the present disclosure provides a storage device that includes a storage medium and a head configured to write data to and read data from the storage medium; and a processor operably coupled to the head and configured to reconfigure the storage device if the instability value is greater than an instability threshold by performing at least one of: deactivating a heater if the head includes two or more heaters; and increasing a fly height between the head and the storage medium.

In another aspect, the present disclosure provides a method that includes writing a selected pattern to a storage medium of a storage device using a head of the storage device; reading the selected pattern from the storage medium using the head to provide a reference data signal; calculating a reference instability value of the head based on the reference data signal; and calculating an instability threshold based on the reference instability value. The method further includes reading the selected pattern from the storage medium using the head to provide a field data signal; calculating a field instability value of the head based on the field data signal; and reconfiguring the storage device if the field instability value is greater than the instability threshold by performing at least one of: deactivating a heater if the head includes two or more heaters; and increasing a fly height between the head and the storage medium.

These and other aspects of the present disclosure will be apparent from the detailed description below. In no event, however, should the above summaries be construed as limitations on the claimed subject matter, which subject matter is defined solely by the attached claims, as may be amended during prosecution.

BRIEF DESCRIPTION OF THE DRAWINGS

Throughout the specification, reference is made to the appended drawings, where like reference numerals designate like elements, and wherein.

DETAILED DESCRIPTION

In general, the present disclosure provides one or more embodiments of devices and methods for reducing thermal stress within a head of a storage device.

Areal densities of storage devices continue to increase. And to read such dense areas, the head media spacing (HMS) between the head and storage medium of these devices may need to be decreased to improve readability of the devices. To achieve a target HMS, heads can be mounted on sliders that include one or more microactuators that adjust a fly height of the device. Such microactuators can include one or more heating elements or heaters that are positioned in the head near one or both of the read and write elements. These heaters can cause thermal expansion of the head near one or both of the read and write elements such that these elements are positioned at the desired target fly heights.

These heaters, however, can cause thermal instability in one or both of the read and write elements. For example, in at least some heads, thermal instability caused by a heater can degrade performance of the read element by inducing voltage fluctuations and large noise spikes, which in turn can cause the storage device to have an unacceptable bit error rate (BER).

Storage devices can be tested during certification for thermal instability of the head of the device using any suitable technique or combination of techniques. If a particular head exhibits greater thermal instability than is acceptable, the particular device may be scrapped. One or more embodiments of the devices and methods described herein can be utilized to prevent these devices from being scrapped for insufficient thermal stability, in turn lowering costs and improving yields.

In one or more embodiments, this thermal instabilty can be reduced by reconfiguring the storage device. Such reconfiguration can be performed during drive certification or when the drive is in use in the field. For example, in one or more embodiments, for storage devices that include two or more heaters for adjusting fly height, power to at least one heater of the device can be reduced or terminated, thereby reducing thermal instability of the head. Further, in one or more embodiments, the fly height can be increased, thereby also reducing the thermal instability of the head.

Figure 1:
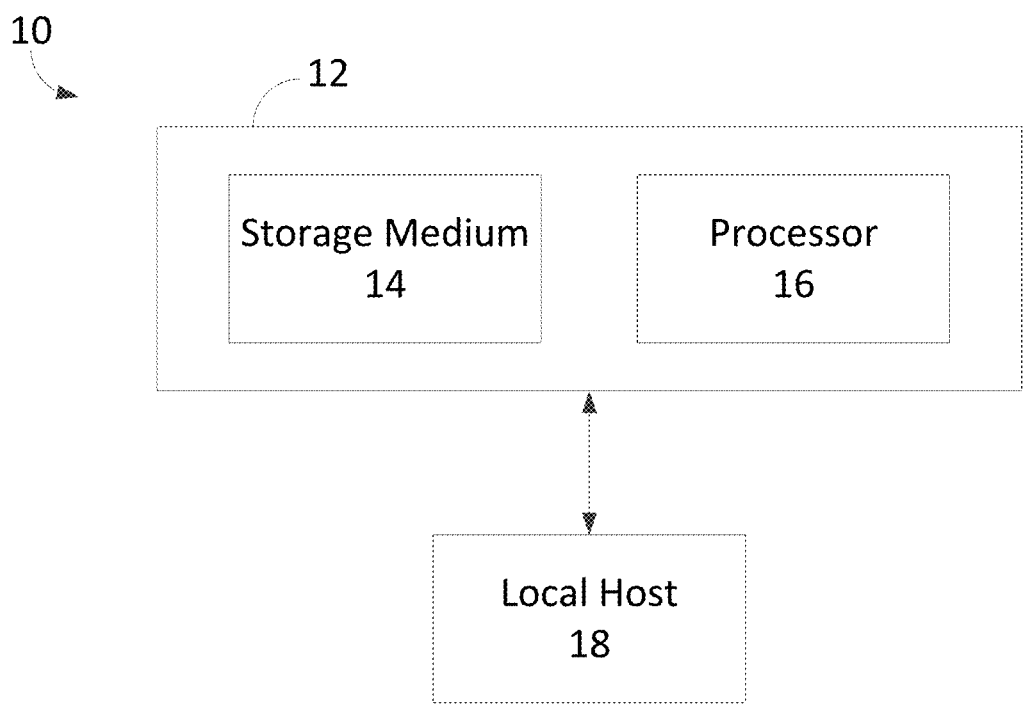
FIG. 1 is a flow diagram of one embodiment of a system.

An exemplary system 10 that can be used in the embodiments described herein is depicted in FIG. 1. The system 10 includes a storage device 12 and a local host 18 (e.g., a testing system, a personal computer system, a laptop, a server system, a cloud storage controller, etc.). In one or more embodiments, the storage device 12 can include one or more heads that are configured to write and read data to and from storage medium 14.

The exemplary system 10 can be operably coupled to the local host 18, e.g., for transferring data therebetween, as shown in FIG. 1. For example, the local host 18 can request data from or send data to the device 12, and the device 12 can provide such requested data to the local host 18 or can write such sent data to the device 12. The device 12 can include a storage medium 14 and a processor or processing apparatus 16 that are operably coupled (e.g., electrically coupled to transmit data therebetween) to each other. The methods, devices, and systems disclosed herein can be generally described in the context of exemplary device 12 and/or exemplary system 10 including exemplary device 12, but that should in no way be taken as limiting the scope of the present disclosure.

Generally, device 12 can be any device and/or apparatus in which data may be written to the storage medium 14 and then read back from the storage medium, and a system 10 can include any device 12, local host 18, and/or any other apparatus needed to execute the exemplary methods and/or processes described herein. The storage medium 14 can include, but is not necessarily limited to, hard magnetic discs, magnetic tapes, optical discs, integrated circuits, volatile memory, nonvolatile memory, etc.

The processor 16 and/or local host 18 can include various circuitry, logic, memory, etc. for use in compensating for thermal instabilities of the head(s) of the storage medium, writing data to and reading data from the storage medium 14, etc. For example, the processor 16 and/or local host 18 can include one or more circuit components such as integrated circuits, processors, etc., that may be configured to interface with the storage medium 14 to control the fly height of the head of a storage device using, e.g., a heater, or heater apparatus. Further, the processor 16 may include a harmonic sensor controller configured to measure harmonic amplitude and convert the amplitude to fly height, or spacing, (e.g., in angstroms, using the Wallace Equation).

Figure 2:
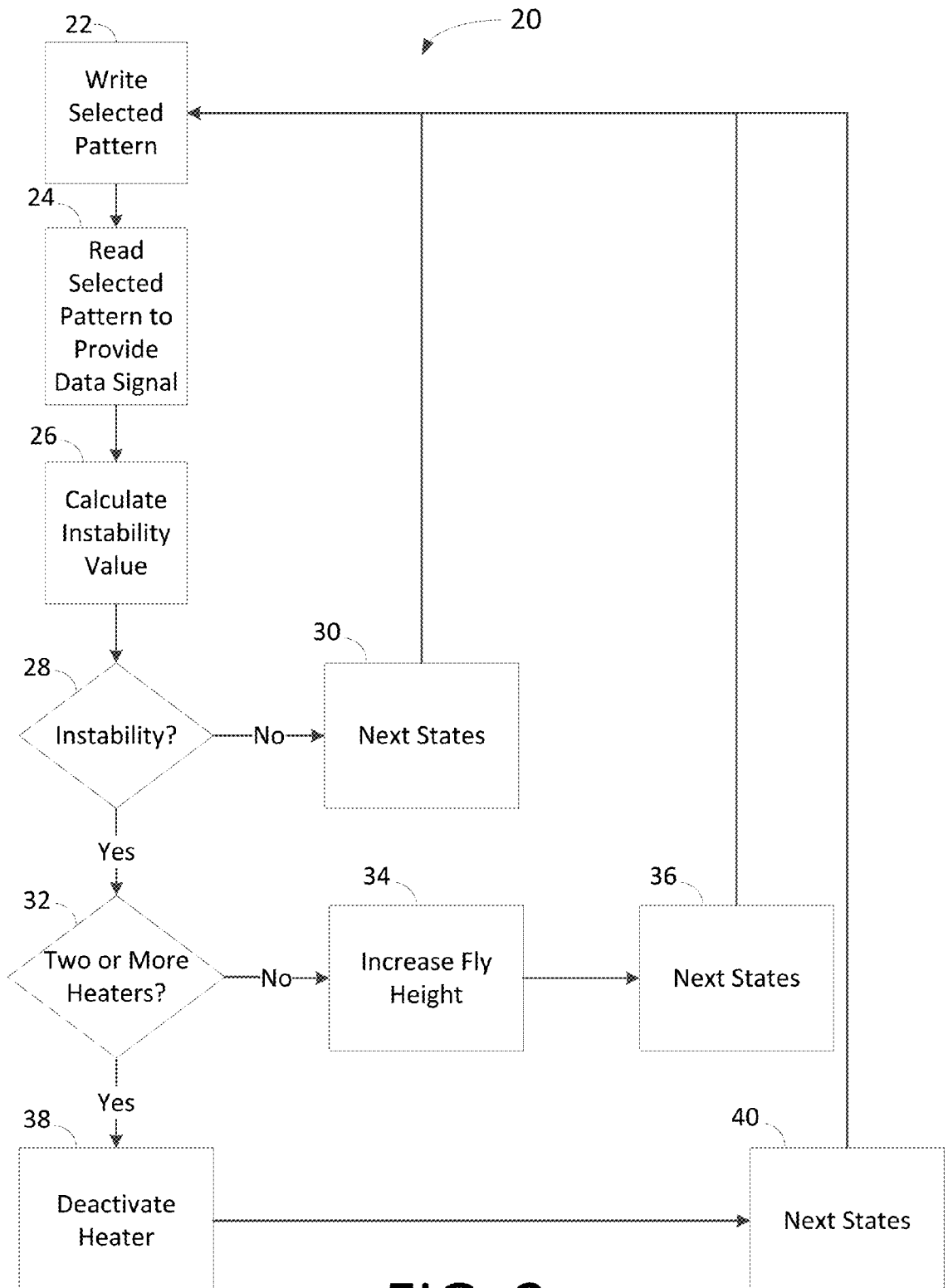
FIG. 2 is a flow diagram of one embodiment of a method of reconfiguring a storage device.

Any suitable technique or combination of techniques can be used to reduce the thermal instability of one or more heads of a storage device. For example, FIG. 2 is a flow diagram of one embodiment of a method 20 of reconfiguring a storage device. As illustrated in FIG. 2, the method 20 includes writing a selected pattern 22 to a storage medium of a storage device using a head of the storage device, e.g., storage device 12 of FIG. 1. The selected pattern 22 can be any suitable pattern. In one or more embodiments, the selected pattern 22 can be a pre-selected signal or data pattern used to test a bit error rate of a storage medium. For example, in one or more embodiments, a specific 2T frequency pattern may be written to the storage medium (e.g., 2T=2/F, where F is the tuned channel frequency by zone, and the 2T pattern is a fixed single tone bit pattern that will be written on the storage medium).

The selected pattern 22 can be read from the storage medium using the head to provide a data signal 24. Any suitable technique or combination of techniques can be used to read the selected pattern. For example, in one or more embodiments, reading the selected pattern can include multiple revolutions and senses of the pattern (e.g., about 20 senses, about 30 senses, about 40 senses, etc.), and each of the senses can be averaged to provide the data signal. In one or more embodiments, the selected pattern can be read for a selected number of reads over a selected time period. The selected number of reads can be between about 25 reads to about 500 reads. In one or more embodiments, the selected number of reads can be greater than or equal to about 25 reads, about 40 reads, about 50 reads, about 60 reads, about 70 reads, about 80 reads, about 90 reads, about 100 reads, about 125 reads, about 150 reads, about 200 reads, about 250 reads, etc. In one or more embodiments, the selected number of reads can be less than or equal to about 500 reads, about 400 reads, about 300 reads, about 250 reads, about 200 reads, about 175 reads, about 150 reads, about 125 reads, about 100 reads, about 90 reads, about 75 reads, about 50 reads, etc.

Additionally, the selected number of reads may be described based on a rate. In one or more embodiments, the selected pattern can be read 24 between about 1 time per minute to about 100 times per minute. In one or more embodiments, the pattern may be read 24 greater than or equal to about 1 time per minute, about 2 times per minute, about 3 times per minute, about 5 times per minute, about 10 times per minute, about 15 times per minute, about 20 times per minute, about 30 times per minute, about 40 times per minute, about 50 times per minute, about 60 times per minute, etc. In one or more embodiments, the selected pattern can be read 24 less than or equal to about 100 times per minute, about 90 times per minute, about 80 times per minute, about 70 times per minute, about 60 times per minute, about 50 times per minute, about 40 times per minute, about 30 times per minute, about 25 times per minute, about 20 times per minute, about 15 times per minute, etc.

An instability value 26 of the head is calculated based on the data signal 24. The instability value 26 can be calculated using any suitable technique or combination of techniques. For example, in one or more embodiments, a bit error rate of the data signal can be determined to provide an instability value. Any suitable technique or combination of techniques can be used to determine the bit error rate of the data signal. In one or more alternative embodiments, a standard deviation of a harmonic amplitude of the data signal can be calculated to provide the instability value of the head. Any suitable technique or combination of techniques can be utilized to determine this standard deviation of the harmonic amplitude of the data signal. Further, in one or more alternative embodiments, a standard deviation of a channel statistic measurement (CSM) variation of the data signal can be calculated to provide an instability value. Any suitable technique or combination of techniques can be utilized to determine the standard deviation of the CSM variation of the data signal. In one or more embodiments, Test T250 Head Instability standard deviation screening can be utilized to calculate an instability value.

In one or more embodiments, an instability value 26 of the entire storage device can be calculated. In one or more alternative embodiments, an instability value 26 for each head of the storage device can be calculated. For example, because the characteristics (e.g., thermal characteristics) of each head may be unique, for devices that include two or more heads (e.g., one head per storage medium for devices that include two or more storage media, multiple heads for each storage medium, etc.), an instability value 26 for each head can be calculated.

Further, in one or more embodiments, a determination can be made as to whether the calculated instability value can be used to reconfigure the device. For example, measurements may be considered flawed if the standard deviation over all the iterations is not expected. Further, in one or more embodiments, an instability value can only be allowable within an expected range. If the instability value is above this range, the maximum allowable reconfiguration of the device can be utilized, whereas if the instability value is below a minimum range, no correction may be needed.

The instability value 26 can be compared to an instability threshold 28. Any suitable instability threshold 28 can be utilized. In one or more embodiments, the instability threshold can include a standard deviation of the BER of the device. For example, a T250 Head Instability Screening test can be performed. This test measures the BER of one of more heads in a storage device and one or more zones of a storage medium one or more times (e.g., a minimum of three times). The BER variation for a particular head and/or zone can be calculated as a standard deviation. The greater the variation in BER the more likely that a head is unstable.

If the instability value 26 of the head of the device is equal to or less than the desired instability threshold 28, then testing proceeds to any desired additional testing or functioning states at 30, e.g., the device or system can perform further testing or can end testing and begin typical read/write routines for reading and/or writing data to and from a storage medium. If, however, the instability value 26 is greater than the desired instability threshold 28, then the storage device can be reconfigured to reduce the thermal instability of the head. Any suitable technique or combination of techniques can be utilized to reconfigure the device.

In one or more embodiments, if the head includes two or more heaters 32 that are functioning as microactuators as previously described herein, then power to one or more heaters can be reduced 38. In such embodiments, any suitable reduction in power can be provided to one or more heaters. For example, power to one or more heaters can be completely reduced, e.g., terminated, such that the one or more heaters are deactivated 38. Testing of the device can then proceed to any suitable next states or functions 40, e.g., the device or system can perform further testing or can end testing and begin a typical read/write routine for reading and/or writing data to and from a storage medium. In one or more embodiments, thermal instability testing of the head can be performed again at 22.

Further, in one or more embodiments, e.g., if the head of the storage device does not include two or more heaters, then the device can be reconfigured by increasing a fly height 34 between the head and the storage medium. Any suitable fly height 34 can be provided such that thermal instability of the head is balanced with the read/write accuracy of the head. For example, an increase in fly height can also increase the BER of the device. A balance, therefore, can be found between reducing the BER of the device related to thermal instability of the head and the BER of the device related to an increased fly height. The device can then proceed to the next states 36 as is further described herein. For example, further testing of the device can be performed, or thermal instability testing can be performed again at 22.

In one or more embodiments, the storage device can be reconfigured by both deactivating a heater and increasing a fly height.

Although not shown in FIG. 2, the storage device can also be reconfigured by annealing the head to reduce thermal instability. Any suitable technique or combination of techniques can be utilized to anneal the head. For example, in one or more embodiments, power to one or more heaters can be increased to an annealing temperature. Further, in one or more embodiments, the head can be annealed either before or after other reconfiguration techniques are utilized. For example, power to one or more heaters can be reduced or eliminated, and then the head can be annealed if thermal instability of the head remains above the desired threshold. Alternatively, in one or more embodiments, the head can first be annealed if the instability value is greater than the instability threshold, and then the device can be further reconfigured if the thermal instability remains above the desired threshold after subsequent testing.

Figure 3:
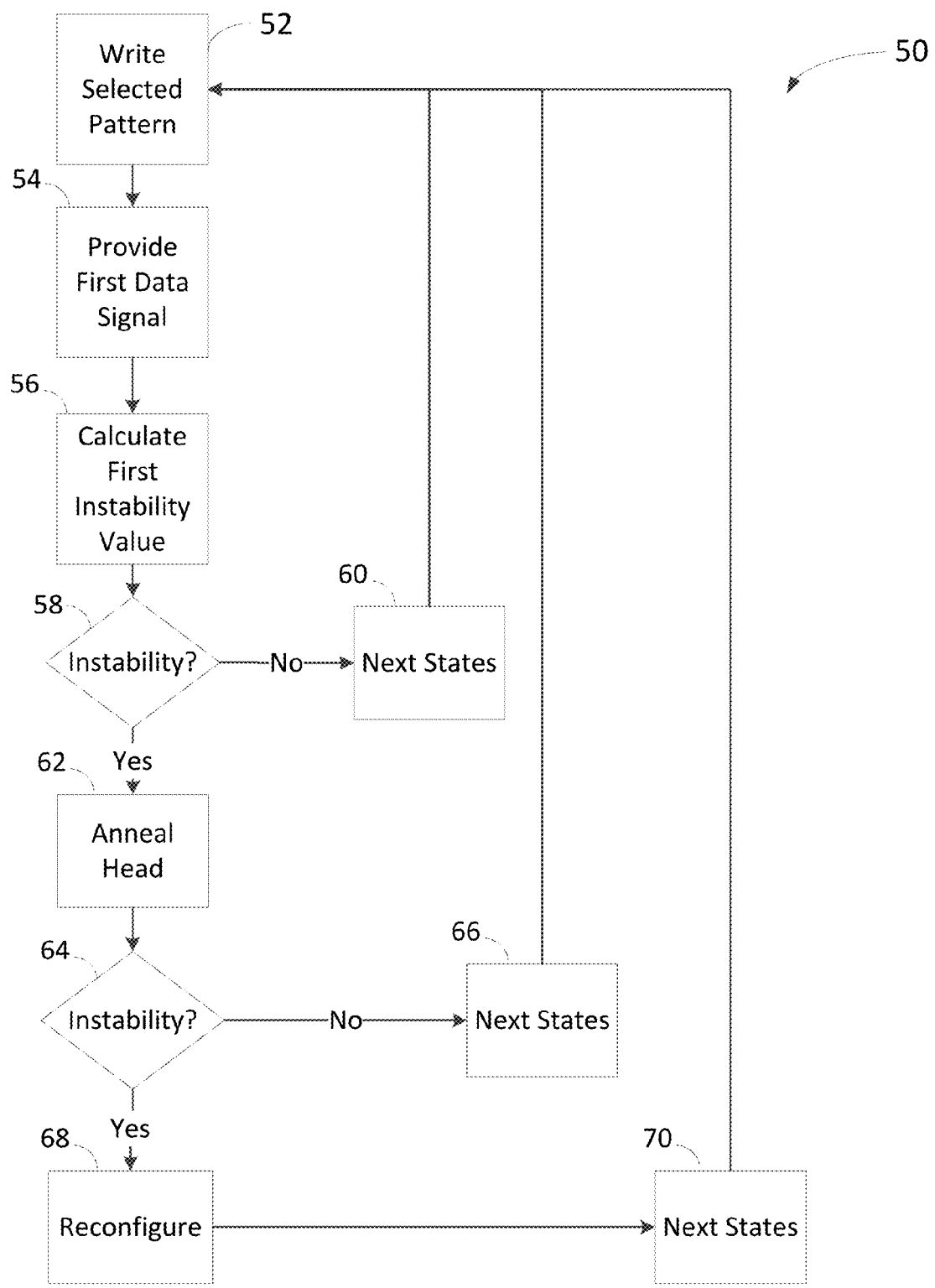
FIG. 3 is a flow diagram of another embodiment of a method of reconfiguring a storage device.

For example, FIG. 3 is a flow diagram of a one embodiment of a method 50 for reducing thermal instability of a storage device (e.g., storage device 12 of FIG. 1). All of the design considerations and possibilities regarding the method 20 of FIG. 2 apply equally to the method 50 of FIG. 3. The method 50 includes writing a selected pattern 52 to a storage medium of a storage device using a head of the storage device. Any suitable pattern 52 can be written to the storage medium, e.g., the patterns described in reference to method 20 of FIG. 2. The selected pattern can be read from the storage medium using the head to provide a first data signal 54. A first instability value 56 of the head based on the first data signal 54 can be calculated. Any suitable technique or combination of techniques can be utilized to calculate the first instability value 56 of the first data signal at 54.

If the first instability value 56 is greater than a first instability threshold 58, then the head can be annealed 62. Any suitable instability threshold can be utilized, e.g., the instability thresholds described in reference to method 20 of FIG. 2. And any suitable technique or combination of techniques can be utilized to anneal the head.

If the first instability threshold is equal to or less than the first instability threshold, then testing of the device can proceed to any desired additional testing or functioning states 60, e.g., the device or system can perform further testing or can end testing and begin a typical read/write routine for reading and/or writing data to and from a storage medium. In one or more embodiments, thermal stability testing of the head can be performed again at 52.

Additional thermal instability testing 64 can then be performed. For example, a selected pattern can be written to the storage medium (e.g., selected pattern 52), and the selected pattern can be read from the storage medium using the head to provide a second data signal. The same selected pattern that was read to provide the first data signal can also be read to provide the second data signal. Alternatively, a different data signal can be written to the storage medium and then read to provide the second data signal.

A second instability value of the head based on the second data signal can be calculated using any suitable technique or combination of techniques described herein, e.g., the techniques described in reference to method 20 of FIG. 2. If the second instability value is greater than a second instability threshold, then the storage device can be reconfigured at 68. Any suitable instability threshold can be used to determine whether the device requires reconfiguration to reduce thermal instability of the head. In one or more embodiments, the second instability threshold can be the same as the first instability threshold. In one or more alternative embodiments, the second instability threshold can be a different instability threshold than the first instability threshold.

If the second instability value of the head is greater than the second instability threshold, then the device can be reconfigured 68 using any suitable technique or combination of techniques. For example, power to one or more heaters of a head of the device can be reduced or terminated (e.g., deactivated) if the device includes two or more heaters as is further described herein in reference to method 20 of FIG. 2. The fly height of the device can be increased using any suitable technique or combination of techniques, e.g., the techniques described for method 20 of FIG. 2. The system can then proceed to any suitable next states 70, e.g., further testing or suitable read/write functions.

If, on the other hand, the second instability value is equal to or less than the second instability threshold, then the system can proceed to any suitable next states 66, e.g., further testing of the device or suitable read/write functions can be performed as is further described herein.

Figure 4:
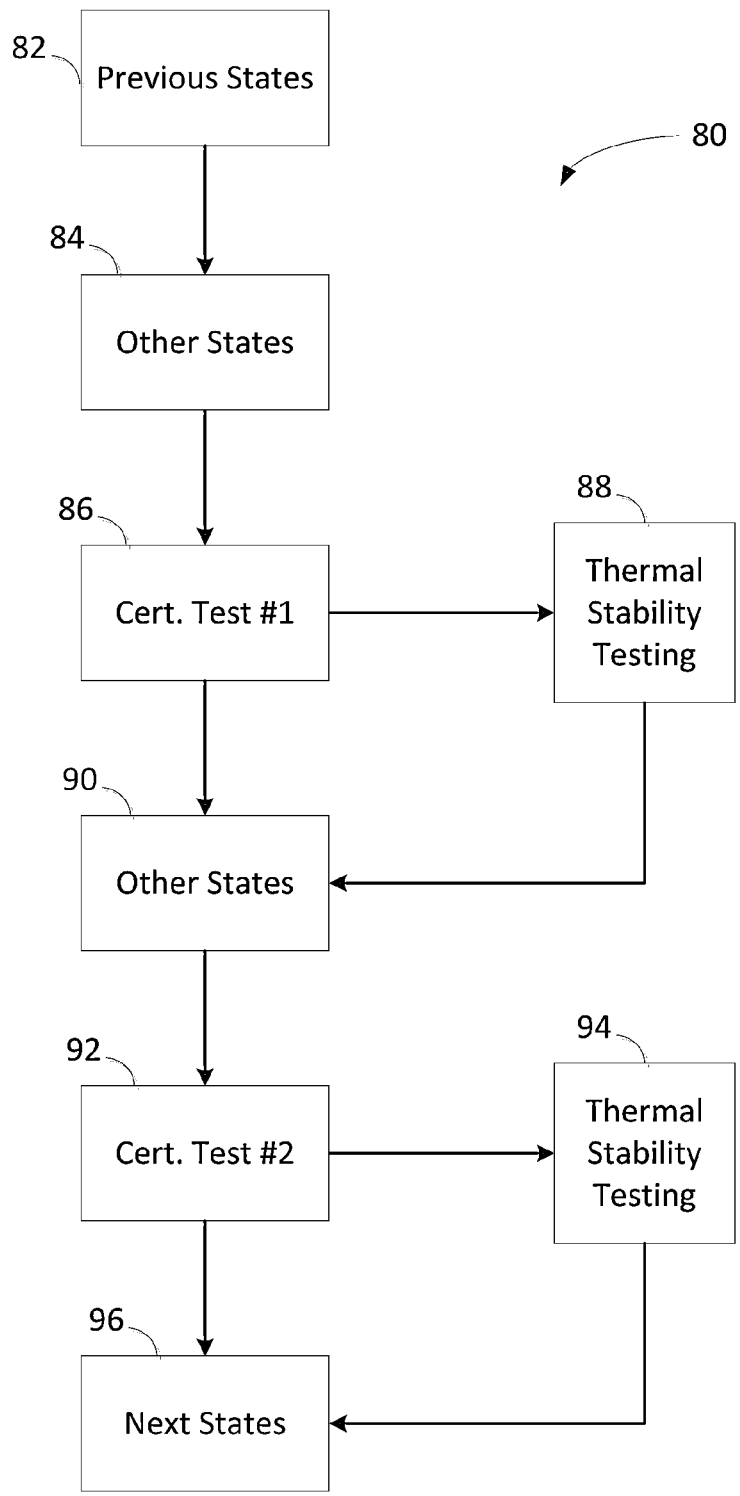
FIG. 4 is a flow diagram of another embodiment of a method of reconfiguring a storage device.

As mentioned herein, the instability methods and techniques described herein can be utilized either in the certification process or during operation of the storage device in the field. Further, the various methods and techniques described herein can be utilized with any suitable certification routines and techniques. For example FIG. 4 is a flow diagram of one method 80 of certifying a storage device, e.g., storage device 12 of FIG. 1. Method 80 can be utilized with any suitable system for certifying a storage device e.g. system 10 of FIG. 1.

In method 80, certification of the storage device can proceed from any suitable previous states 82, e.g., read opti calibration states, defect mapping and flawscan states, thermal clearance slope calibration states, etc. A first certification test 86 can be performed on the storage device. Any suitable certification testing or routines can be utilized. During or after completion of the first certification test 84, thermal stability testing 88 can be performed. Any suitable thermal stability testing and methods can be utilized at 86, e.g., method 20 of FIG. 2, method 50 of FIG. 3, etc. If the thermal stability of the device is at an acceptable level, then method 80 can proceed to any suitable next states 90. If, however, thermal stability of the device is greater than an instability threshold as is further described herein, then the device can be reconfigured using any suitable technique or combination of techniques described herein, e.g., one or more heaters of the head can be deactivated and/or a fly height can be increased.

A subsequent second certification test 92 can be performed. Any suitable certification test or tests can be performed at 92. Either during or following the second certification test at 92, additional thermal stability testing can be performed 94. Any suitable methods or techniques described herein can be utilized at 94, e.g., method 20 of FIG. 2, method 50 of FIG. 3, etc. After thermal stability testing and potential reconfiguration of the storage device at 94, routine 80 can proceed to any suitable next states 96.

Figure 5:
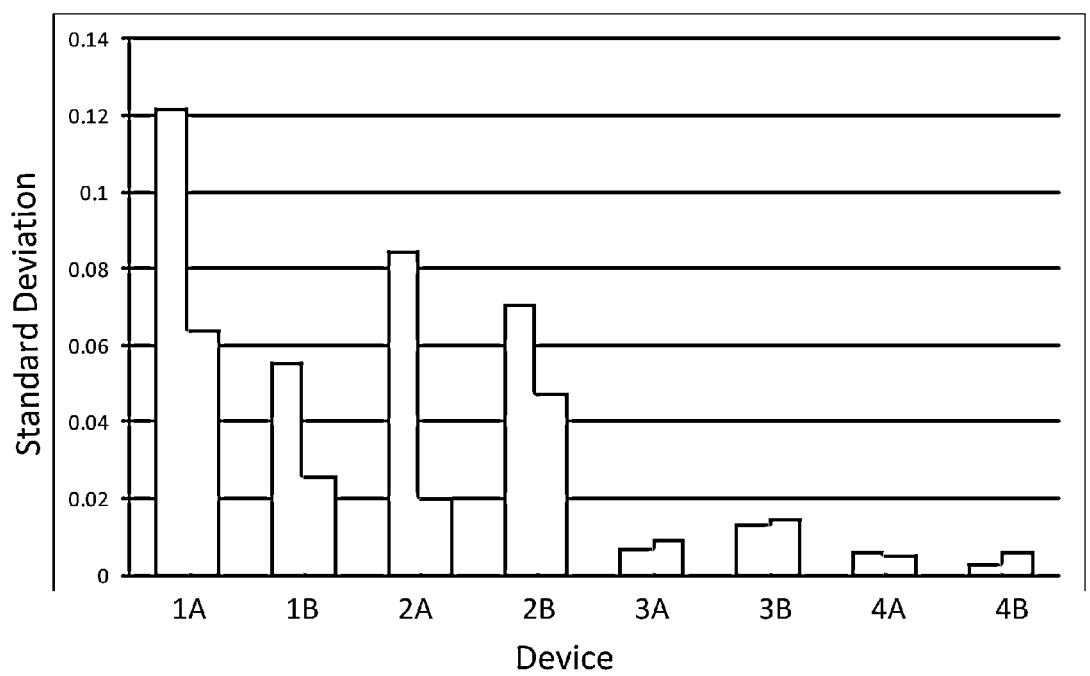
FIG. 5 is a graph of standard deviation of a bit error rate for several exemplary storage devices both before and after the devices have been reconfigured.

A chart comparing exemplary thermal instability testing and reconfiguration in various exemplary storage devices is shown in FIG. 5. T 250 instability standard deviation screening was performed on the exemplary storage devices and the results between devices prior to thermal instability testing and reconfiguration (i.e., the first bar for each device), and results where such testing and reconfiguration has been performed (i.e., the second bar for each device) are shown. In FIG. 5, the exemplary devices are reconfigured by deactivating a read element heater while leaving the write element heater active. In a typical head of a storage device, the read element heater is spaced a greater distance apart from the storage medium than the write element heater. As a result, a greater amount of heat may have to be provided by the read element heater to achieve the desired fly height during a read function than if the write element heater is used during the read function to achieve the same fly height.

T 250 was measured three times and the standard deviation was calculated. If the standard deviation is greater than a certain instability threshold, e.g., 0.05 DCD (i.e., 0.05 decades), then the head is considered thermally unstable.

As shown in FIG. 5, a significant reduction in T 250 standard deviation can be achieved utilizing the thermal instability testing and reconfiguration techniques described herein. For example exemplary storage devices 1A-B exhibit a −11 DAC value for heat relief, while exemplary devices 2A-B exhibit a −29 DAC heat relief or approximately −14° C. temperature relief. Further, devices 3A-B exhibit 2% ADC loss, while devices 4A-B exhibit 1.8% ADC loss. Devices 3A-B and 4A-B include heads that did not exhibit thermal instability above the instability threshold of, e.g., 0.06 DCD and, therefore, did not require or benefit from the thermal instability testing and methods described herein.

Figure 6A:
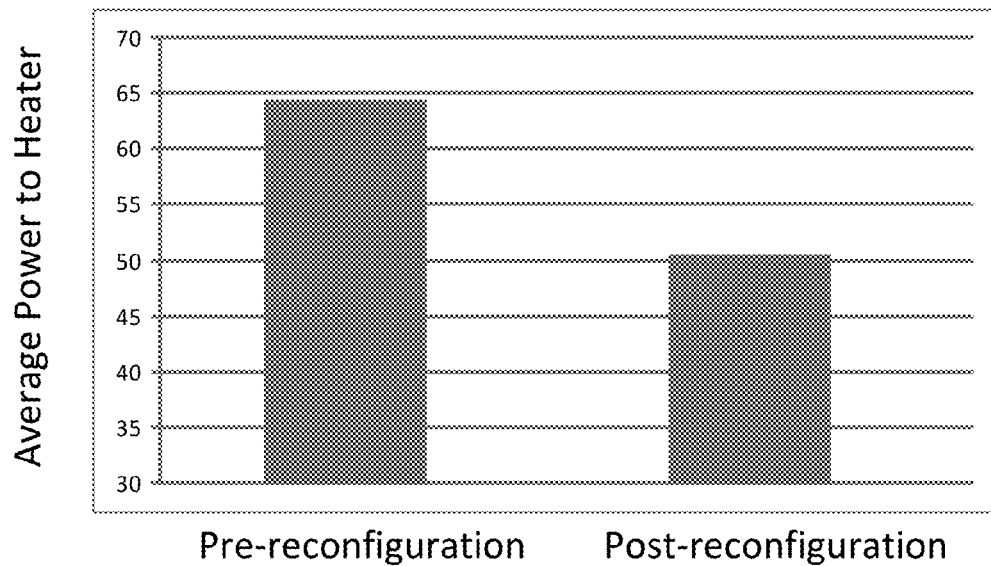
FIG. 6A is a graph of average power to a heater for an exemplary storage device before and after the device has been reconfigured.
Figure 6B:
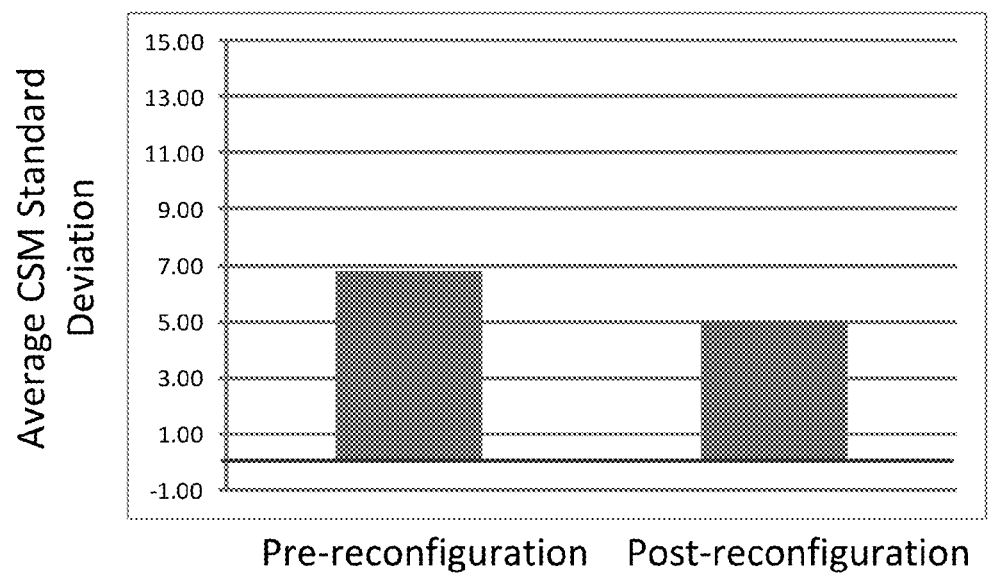
FIG. 6B is a graph of average CSM standard deviation for an exemplary storage device before and after the device has been reconfigured.

FIGS. 6A-B are graphs comparing exemplary thermal instability testing and reconfiguration applied to exemplary devices that may have failed typical instability testing. As can be seen in FIG. 6A, a −15 DAC heat relief was provided to the storage device by deactivating one of the heaters of the head.

FIG. 6B illustrates that CSM variation also improved with reduction of heat in the head. In general, the CSM variation can be determined by writing a test pattern to a track and reading the track multiple times to acquire a CSM count output. A standard deviation and average of the CSM count can be calculated. A greater variation in the CSM count can indicate that the head is unstable.

Figure 7:
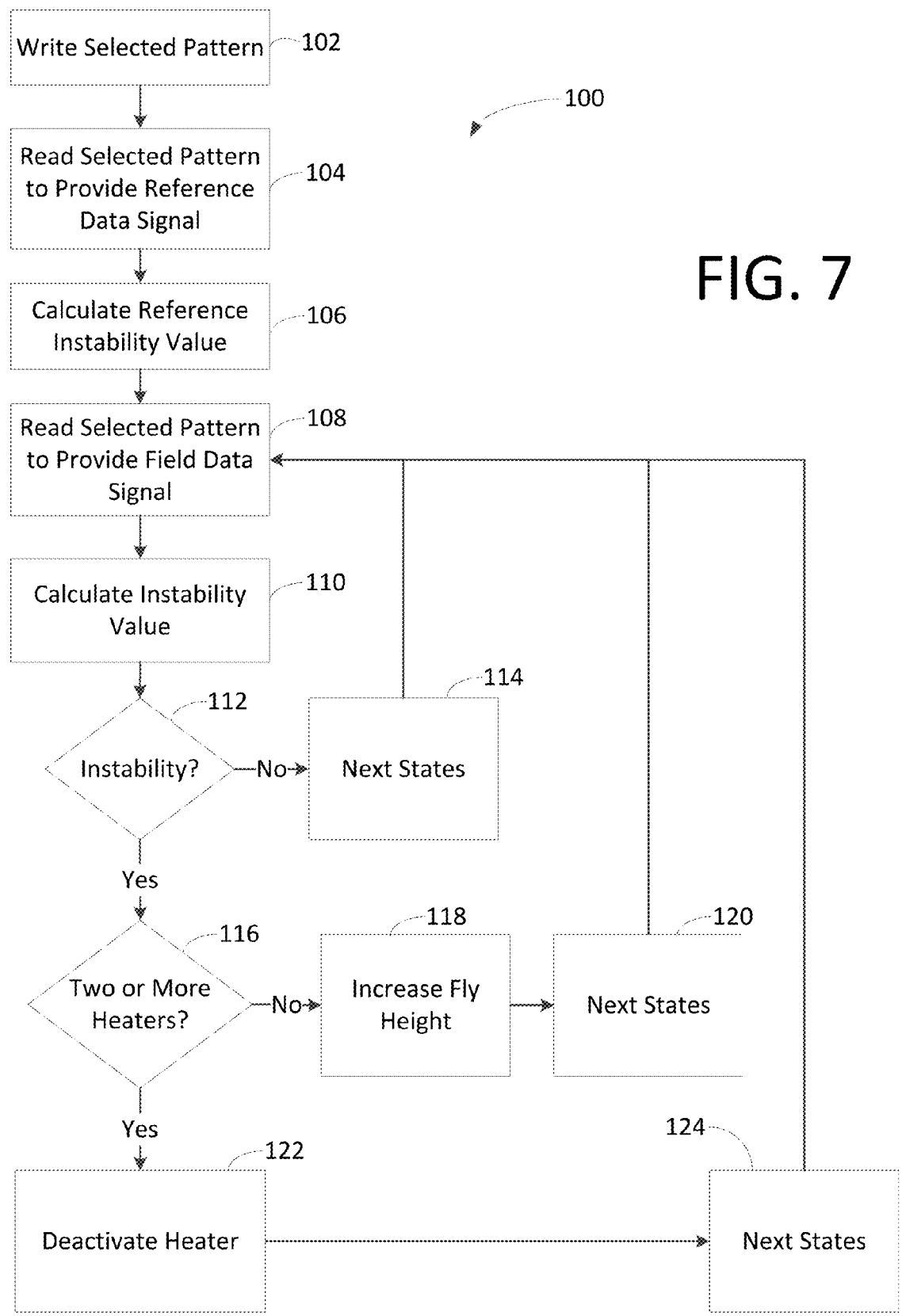
FIG. 7 is a flow diagram of another embodiment of a method of reconfiguring a storage device.

The thermal instability testing and reconfiguration methods described herein can be performed either during certification of a storage device or in the field during operation of the device. For example, FIG. 7 is a flow diagram of one exemplary embodiment of a method 100. All of the design considerations and possibilities regarding method 20 of FIG. 1 and method 50 of FIG. 2 apply equally to method 100 of FIG. 7. In method 100, a selected pattern 102 can be written to a storage medium of a storage device using a head of the storage device during certification of the storage device. Any suitable pattern can be written to the storage medium, e.g., the selected patterns described in reference to method 20 of FIG. 2. The selected pattern can be read from the storage medium using the head to provide a reference data signal 104. A reference instability value 106 can be calculated based on the reference data signal 104. Any suitable technique or combination of techniques described herein can be used to calculate the reference instability value. For example, harmonic amplitude variations can be calculated from the reference data signal and a standard deviation and range can be determined. Further for example, bit error rate variations can be calculated from the reference data signal and statistical standard deviation and range can be determined. The reference instability value can be saved during certification and later retrieved during field testing as is further described herein.

Further, the reference instability value can be utilized to calculate a reference instability threshold. Any suitable technique or combination of techniques can be utilized to calculate this instability threshold from the reference instability value. For example, the reference instability threshold can be based on, e.g., the bit error rate standard deviation, the CSM standard deviation, or the harmonic amplitude standard deviation. A reference instability value or values can be stored and accessed in the field for comparison during field testing of the storage device.

Following certification, the storage device can be placed in use in the field. Any suitable technique or combination of techniques described herein can be utilized to test thermal instability of the head during field operation of the device. For example, such testing can be performed during one or more power cycles when the drive is idle. Alternatively, such testing can be performed when the drive is performing standard read/write functions.

In the field, a selected pattern that has been written to the storage medium of the device can be read to provide a field data signal 108. The same selected pattern 102 written during certification can be read in the field to provide the field data signal 108. Alternatively, a different selected pattern can be written to the storage medium during field testing.

A field instability value 110 of the head can be calculated based on the field data signal 108. Any suitable technique or combination of techniques can be utilized to calculate the field instability value 110 of the head. For example, in one or more embodiments, the harmonic amplitude of the field data signal can be measured and the field instability value can be determined from the measured harmonic variation. In one or more embodiments, the variation in bit error rate can be calculated from the field data signal and a field instability value provided from this bit error rate information.

The field instability value can be compared to the instability threshold to determine whether the head of the storage device exhibits undesirable thermal instability. In one or more embodiments, the instability threshold based on the reference instability value can be compared to the field instability value at 112. If the field instability value is greater than the instability threshold, then the storage device can be reconfigured using any suitable technique or combination of techniques described herein. For example, in one or more embodiments, power to one or more heaters can be reduced or terminated such that the one or more heaters are deactivated 122 if the head of the storage device includes two or more heaters 116. Method 100 can then proceed to any suitable next states at 124, including further testing for thermal instability at 108.

In addition to or instead of deactivating at least one heater, the fly height 118 can be increased. Any suitable fly height can be selected to provide thermal relief to the head while balancing a desired bit error rate of the device. Following an increase in fly height at 118, the method 100 can proceed to any suitable next states 120, including further testing for thermal instability at 108.

If the field instability value is equal to or less than the instability threshold, then the method 100 can proceed to any suitable next states 114, e.g., typical read/write functions or further testing.

The methods, techniques, and/or processes described in this disclosure, including those attributed to the processor, or various constituent components, may be implemented, at least in part, in hardware, software, firmware, or any combination thereof. For example, various aspects of the techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processing apparatus," "processor," or "processing circuitry" may generally refer to any of the foregoing logic circuitry, alone or in combination with other logic circuitry, or any other equivalent circuitry.

Such hardware, software, and/or firmware may be implemented within the same device or within separate devices to support the various operations and functions described in this disclosure. In addition, any of the described units, modules, or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components.

When implemented in software, the functionality ascribed to the systems, devices and techniques described in this disclosure may be embodied as instructions on a computer-readable medium such as RAM, ROM, NVRAM, EEPROM, FLASH memory, STRAM, RRAM, magnetic data storage media, optical data storage media, or the like. The instructions may be executed by one or more processors to support one or more aspects of the functionality described in this disclosure.

In the preceding description, reference is made to the accompanying set of drawings that form a part hereof and in which are shown by way of illustration several specific embodiments. It is to be understood that other embodiments are contemplated and may be made without departing from the scope or spirit of the present disclosure. The preceding detailed description, therefore, is not to be taken in a limiting sense.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the properties sought to be obtained by those skilled in the art utilizing the teachings disclosed herein.

The recitation of numerical ranges by endpoints includes all numbers subsumed within that range (e.g. 1 to 5 includes 1, 1.5, 2, 2.75, 3, 3.80, 4, and 5) and any range within that range.

As used in this specification and the appended claims, the singular forms "a," "an," and "the" encompass embodiments having plural referents, unless the content clearly dictates otherwise. As used in this specification and the appended claims, the term "or" is generally employed in its sense including "and/or" unless the content clearly dictates otherwise.

"Include," "including," or like terms means encompassing but not limited to, that is, including and not exclusive. It should be noted that "top" and "bottom" (or other terms like "upper" and "lower") are utilized strictly for relative descriptions and do not imply any overall orientation of the article in which the described element is located.

All references and publications cited herein are expressly incorporated herein by reference in their entirety into this disclosure, except to the extent they may directly contradict this disclosure. Illustrative embodiments of this disclosure are discussed and reference has been made to possible variations within the scope of this disclosure. These and other variations and modifications in the disclosure will be apparent to those skilled in the art without departing from the scope of the disclosure, and it should be understood that this disclosure is not limited to the illustrative embodiments set forth herein. Accordingly, the disclosure is to be limited only by the claims provided below.

What is claimed is:

1. A method comprising:
writing a selected pattern to a storage medium of a storage device using a head of the storage device;
reading the selected pattern from the storage medium using the head to provide a data signal;
calculating an instability value of the head based on the data signal by either calculating a standard deviation of a harmonic amplitude of the data signal or calculating a standard deviation of a channel statistic measurement (CSM) variation of the data signal; and
reconfiguring the storage device if the instability value is greater than an instability threshold by performing at least one of:
deactivating a heater if the head comprises two or more heaters; and
increasing a fly height between the head and the storage medium.

2. The method of claim 1, wherein the selected pattern comprises a 2T frequency pattern.

3. The method of claim 1, wherein calculating the instability value further comprises determining a bit error rate of the data signal.

4. The method of claim 1, wherein deactivating the heater comprises terminating power to the heater if the head comprises two or more heaters.

5. The method of claim 1, wherein reconfiguring the storage device further comprises annealing the head if the instability value is greater than the instability threshold.

6. The method of claim 1, wherein the storage device comprises a plurality of heads, wherein calculating the instability value of the head further comprises calculating an instability value of each head of the plurality of heads based on the data signal and using the instability value for each of the plurality of heads.

7. The method of claim 1, further comprising performing a first certification test before writing the selected pattern to the storage medium.

8. A method comprising:
writing a selected pattern to a storage medium of a storage device using a head of the storage device;
reading the selected pattern from the storage medium using the head to provide a first data signal;
calculating a first instability value of the head based on the first data signal;
annealing the head if the first instability value is greater than a first instability threshold;
reading the selected pattern from the storage medium using the head to provide a second data signal;
calculating a second instability value of the head based on the second data signal; and
reconfiguring the storage device if the second instability value is greater than a second instability threshold by performing at least one of:
deactivating a heater if the head comprises two or more heaters; and
increasing a fly height between the head and the storage medium.

9. The method of claim 8, wherein the first instability threshold is the same as the second instability threshold.

10. The method of claim 8, wherein calculating the first instability value comprises determining a bit error rate of the first data signal.

11. The method of claim 8, wherein calculating the second instability value comprises determining a bit error rate of the second data signal.

12. The method of claim 8, wherein annealing the head comprises increasing power to a heater to an annealing temperature.

13. The method of claim 8, wherein calculating the first instability value comprises calculating a standard deviation of a harmonic amplitude of the first data signal.

14. The method of claim 8, wherein calculating the second instability value comprises calculating a standard deviation of a harmonic amplitude of the second data signal.

15. A system comprising:
a computing apparatus configured to be coupled to one or more storage devices, each storage device comprising a storage medium and a plurality of heads configured to write and read data from the storage medium, the computing apparatus configured to:
write a selected pattern to the storage medium using the head of at least one storage device;
read the selected pattern from the storage medium using the head to provide a data signal;
calculate an instability value for each of the plurality of heads based on the data signal; and
reconfigure the storage device if the instability value is greater than an instability threshold by performing at least one of:
deactivating a heater if the head comprises two or more heaters; and
increasing a fly height between the head and the storage medium.

16. The system of claim 15, wherein the instability value comprises a bit error rate of the data signal.

17. The system of claim 15, wherein the instability value comprises a standard deviation of a harmonic amplitude of the data signal.

18. The system of claim 15, wherein the instability value comprises a standard deviation of a CSM variation of the data signal.

19. The system of claim 15, wherein the computing apparatus is further configured to calculate an instability value for the system using the instability value for each of the plurality of heads.

20. The system of claim 15, wherein the computing apparatus is further configured to anneal a head of the plurality of heads if the instability value of the head is greater than the instability threshold.

* * * * *